May 31, 1966  E. O. LA FAVE  3,253,808
AIRCRAFT WITH BOUNDARY LAYER CONTROL
Filed Dec. 1, 1964  3 Sheets-Sheet 3
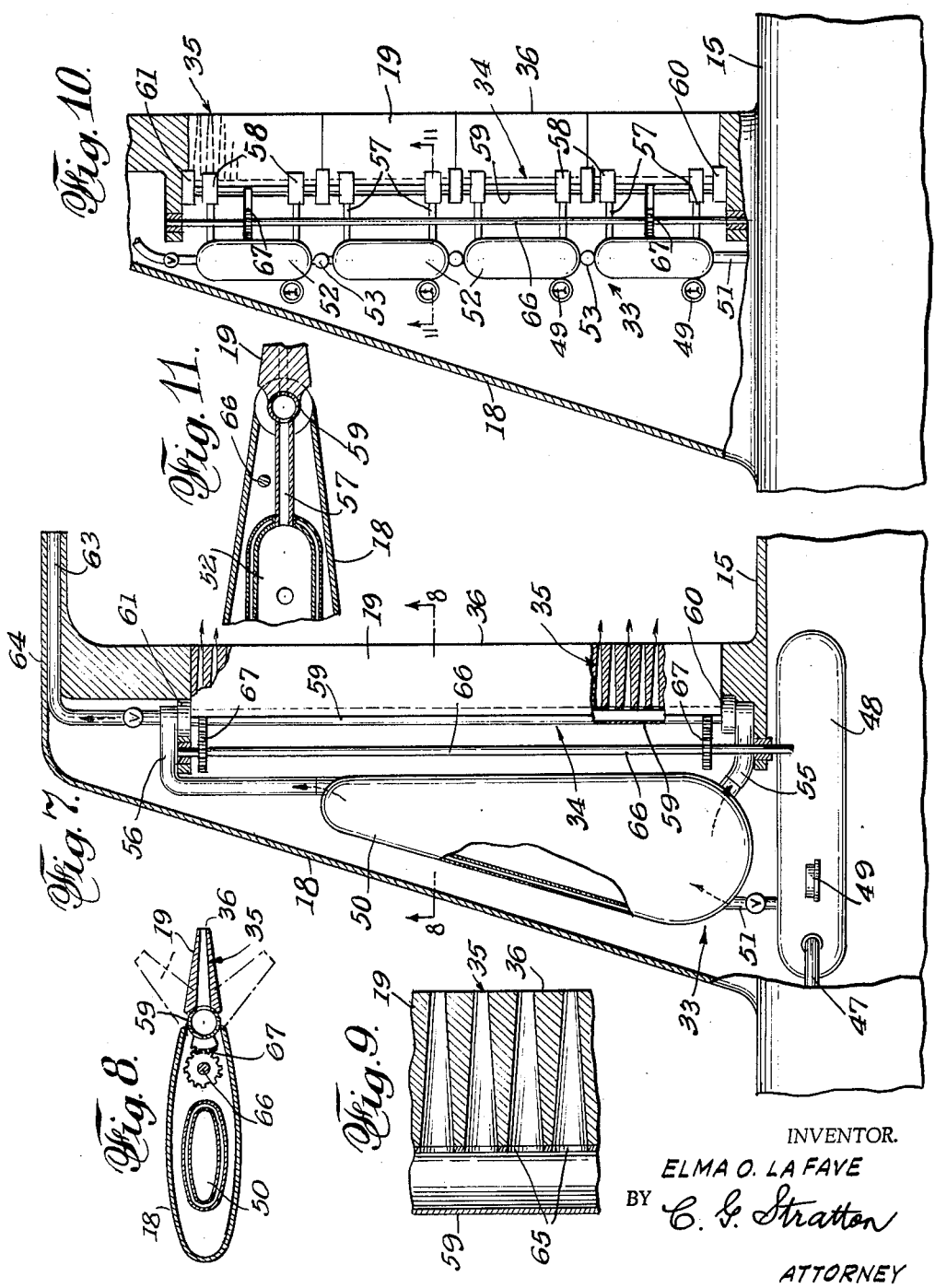
INVENTOR.
ELMA O. LA FAVE
BY C. G. Stratton
ATTORNEY

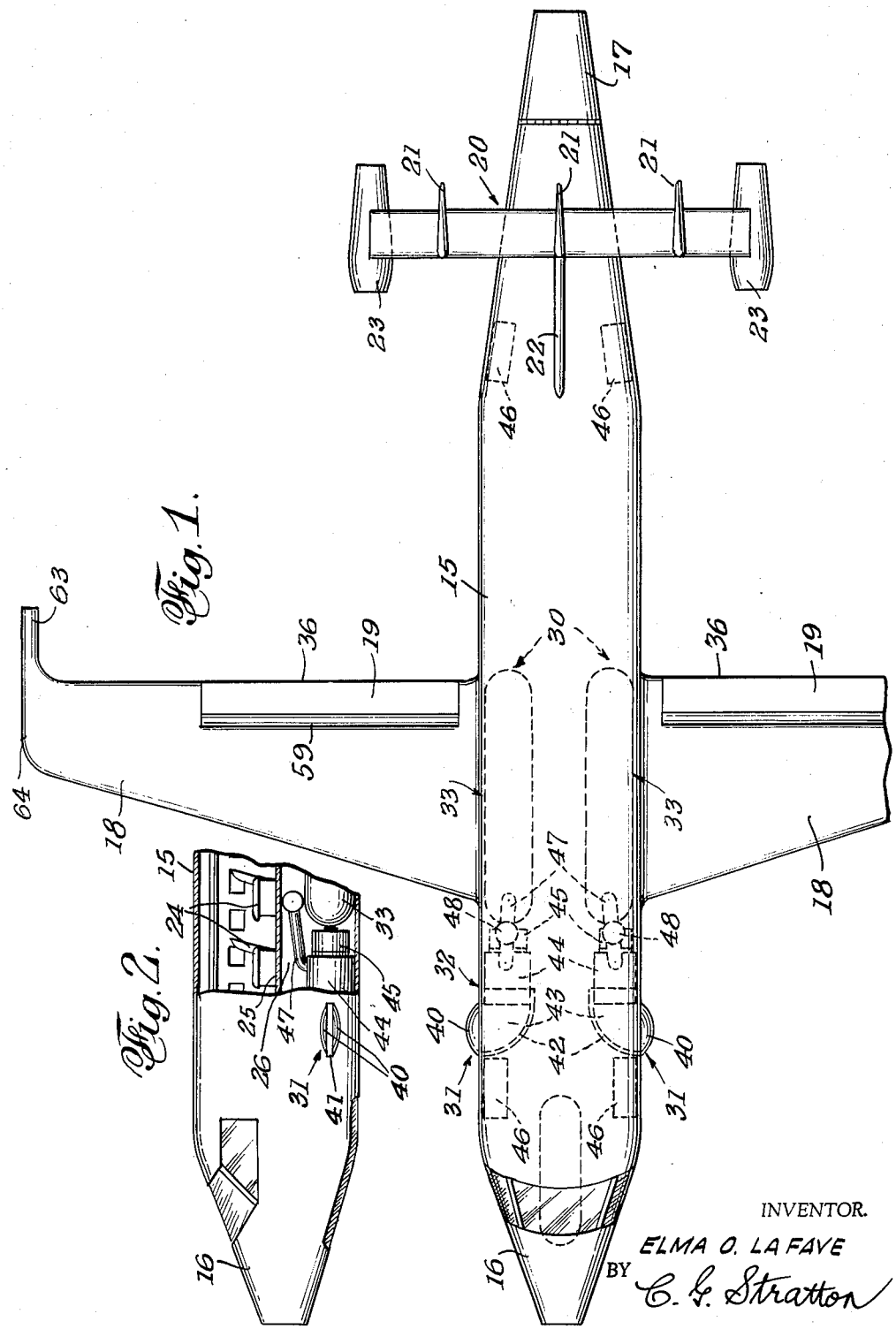

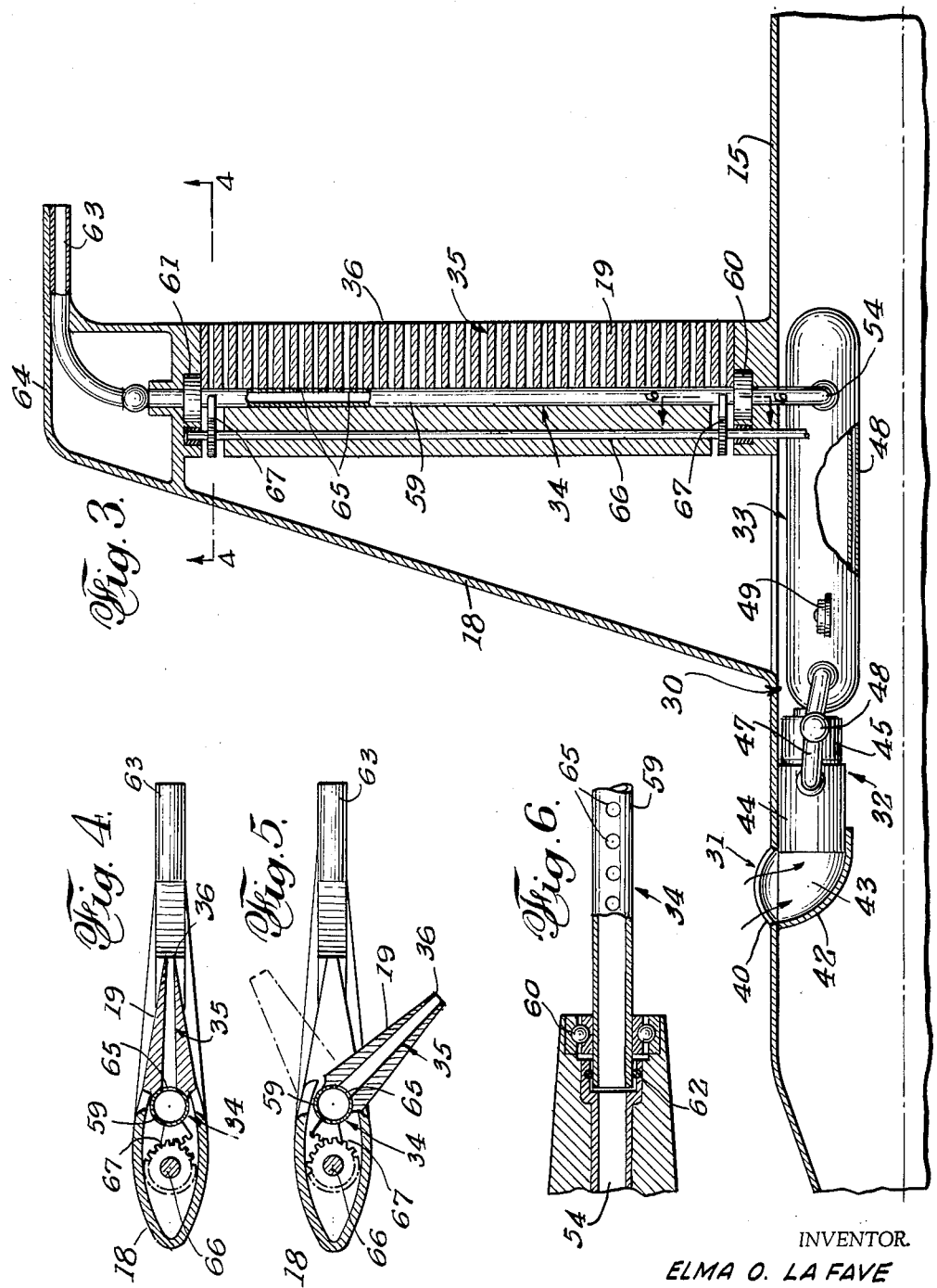

United States Patent Office 3,253,808
Patented May 31, 1966

---

3,253,808
AIRCRAFT WITH BOUNDARY LAYER CONTROL
Elma O. La Fave, 1227 E. Colorado St.,
Glendale, Calif. 91205
Filed Dec. 1, 1964, Ser. No. 415,137
9 Claims. (Cl. 244—75)

This invention relates to aircraft, and more particularly to that form of aircraft having fixed wings and a power plant, and more properly known as airplanes.

Almost from the time of the first powered flight, man has known of the existence of the boundary layer which is defined by the National Aeronautics and Space Administration as "A thin layer of fluid (air) next to the surface of a body in a moving stream (as an airfoil in an airstream)," and the fact that its removal will increase the efficiency of the airplane by decreasing its drag and increasing its lift. The boundary layer may be removed by either suction or blowing away with a stream or streams of air under pressure from one or more openings in the wing of an airplane or from the trailing edge of the wing and/or its ailerons or the like.

The present invention has for an object to remove the boundary layer by suction created entirely by air drawn into the fuselage of the plane, and by ejecting the same, after compression, from the trailing edges of the ailerons.

Another object of the invention is to provide means for efficiently removing the boundary layer of a plane wing by utilizing only the air around the plane while taking off or landing.

A further object of the invention is to provide novel scoop means applied to the outer surfaces of the plane's fuselage for gathering air for the purposes above mentioned.

A still further object of the invention is to provide simplified and improved means for compressing the air thus gathered and directing the same under such pressure to storage, from which said compressed air is discharged rearwardly through the wings' ailerons for the contemplated purpose above mentioned.

A yet further object of the invention is to provide improved duct or passage means in the ailerons so that, upon discharge of air from said passages, the same accelerates its speed and provides the boundary layer removal above mentioned.

Another object of this invention is to provide boundary layer control mechanism and structure that operates independently of the craft's power plants.

Another object of this invention is to provide boundary layer control mechanism and structure that will operate even though there is power plant failure.

Another object of this invention is to provide boundary layer control mechanism and structure that will materially increase the overall safety of all airplanes so equipped and therefore reduce if not totally eliminate airplane accidents due to stalls.

Another object of this invention is to provide boundary layer control mechanism and structure that will permit considerable increase in payload of any airplane so equipped with this invention.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes, preferred embodiments of the present invention, which are given by way of illustration or example only.

FIG. 1 is a plan view, with one wing broken away, showing an airplane provided with boundary layer eliminating means according to the present invention.

FIG. 2 is a broken side elevational view of the fuselage of the airplane shown in FIG. 1, a portion thereof being in vertical section.

FIG. 3 is an enlarged and fragmentary plan sectional view of a wing and the connecting fuselage portions of the airplane shown in FIG. 1.

FIG. 4 is a further enlarged cross-sectional view taken through the wing on the line 4—4 of FIG. 3.

FIG. 5 is a similar view with the aileron of said wing turned down.

FIG. 6 is a vertical sectional and fragmentary view, as taken on the line 6—6 of FIG. 3.

FIG. 7 is a view, similar to FIG. 3, of a modification.

FIG. 8 is a cross-sectional view as taken on the line 8—8 of FIG. 7.

FIG. 9 is a plan sectional view of the right hand portion of FIG. 8.

FIG. 10 is a plan sectional view of another form of wing and aileron construction.

FIG. 11 is an enlarged cross-sectional view of another modification.

The airplane that is illustrated in FIGS. 1 and 2 comprises, typically, a fuselage 15 with a nose 16 in which the cockpit and navigation areas of the plane are housed, and with a tail part 17 that may be aerodynamically designed as is the nose 16; a pair of similar oppositely directed wings 18 extending from said fuselage, each being provided with an aileron or flap 19; and an empennage 20 that comprises vertical stabilizers 21 that are conventionally equipped with rudders (not shown) and which is mounted on the tail by a fin or fins 22. Jet engines 23 are mounted on the opposite ends of the elevator assembly for the usual purpose of maintaining the airplane in flight.

As shown in FIG. 2, the present fuselage is conventionally provided with seating 24 for passengers, the same being supported by a floor 25 defining an area 26 therebelow for housing those components of the present boundary layer control means that are housed in the fuselage.

The present boundary layer control means is provided as two similar but oppositely arranged mechanisms 30, the following description of one serving to describe the other, also.

The means 30 comprises, generally, an air scoop 31 preferably in the side wall of the fuselage 15, means 32 to compress the air entering the scoop, compressed air collector tank means 33, passage means 34 receptive of air from the tank means 33, and a set of tubular passages 35 in the aileron 19 receiving air from the passage means 34 and discharging the same rearwardly from the trailing edge 36.

The air scoop 31 is in the form of an oval turret which is defined by upper and lower shell portions 40 that extend into the airstream flowing along the sides of a fuselage with the airplane in motion, and are spaced apart as at 41 to form a mouth into which such air may enter. The shell portions 40 are connected by an inside shell 42 which defines a passage 43 which conducts air rearwardly to the air-compressing means 32.

The latter means comprises an air compressor 44 which is fitted to the discharge end of the passage 43, the same being preferably driven by an electric motor 45 that may receive current from storage batteries or generators 46 or any other suitable source of electric power.

It will be clear that compressed air will be discharged by the conduit 47 in which the flow may be controlled by a solenoid-controlled valve 48. Said conduit enters the collector tank means 33.

Said tank means is shown in the form of FIG. 3, as a jacketed tank 48 that may be provided with a pressure gauge 49; in the form of FIG. 7, as the tank 48 and an auxiliary storage tank 50 housed in the wing 18, with a valved connection 51 between said tanks; and in the form of FIG. 10, as said tank 48 and a series of tanks 52, also housed in the wing 18 and connected in series by valved connections 53. All of the tank means may be provided with gauges 49. In the form of FIG. 3, the pressurized air from tank 48 is conducted directly to the end of the passage means 34 by a valved conduit 54. In the form of FIG. 7, such air is conducted by conduits 55 and 56 to the opposite ends of the passage means 34. In the form of FIG. 10, the pressurized air in the series of tanks 52 is conducted by conduits 57 to different portions of the means 34 through manifold connections 58.

The form of FIG. 10 provides a safety factor that enables any remaining portion of a broken wing to function with the boundary layer control means, since the tanks 52 in said remaining wing portion may be closed off by the valves or connections 53 that have not been broken away by such wing loss. The aileron also is formed of sections, as shown.

The passage means 34 comprises a tube 59 that is mounted, at opposite ends, in bearings 60 and 61 at the ends of the ailerons 19. FIG. 6 shows the bearing 60 which not only journals tube 59 so the same may rotate, but also includes means 62 that effect a non-leakage sealing connection with the conduit 54 which conducts pressurized air to the tube 59. In the forms of FIGS. 3 and 7, the bearing 61 similarly has a leakage-sealing connection with an exhaust tube 63 which is rearwardly directed from the wing tips 64. The tube 59 is provided with a longitudinal series of orifices 65 that are arranged on the rearward side of said tube.

The aileron 19 is affixed to the tube 59 and, as shown in FIGS. 5 and 8, said aileron may be moved to an angular disposition either up or down by rotation of said tube. The means shown for this purpose comprises a shaft 66 rotation of which may be controlled from the cockpit in the nose 16 and gearing connections 67 between said shaft and the tube 59 to which the same is parallel. The shaft 66 need not have a full rotational movement, only one sufficient to move the aileron from a normal wing-aligned position to angular positions, as in FIGS. 5 and 8.

The aileron has a set of tubular passages 35 that are connected extensions of the orifices 65. Said passages are preferably tapered, as in FIG. 9, to be smaller where the same terminate at aileron edge 36. Said passages may be round but are preferably of oval form. The constriction imposed by the tapered form of the passages 35 causes maximum compression of the air flow in said passages and, therefore, rapid movement of this air away from the aileron edge 36 as the same is released from passages 35. It is this rapid air movement that creates a vacuum at the edge 36 and, therefore, a corresponding lowering of pressure across the wings in the boundary layer around the wing. Lift at takeoff and landing is, thereby, increased.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described this invention, what is claimed and desired to be secured by Letters Patent is:

1. In an aircraft having a wing extending from its fuselage and provided with an aileron having its trailing edge aligned with the trailing edge of the wing, boundary layer control means comprising:
    (a) air scoop means extending from the fuselage of the aircraft,
    (b) means to compress the air drawn into said scoop means during takeoff and landing flight of the aircraft,
    (c) means to conduct said compressed air to the aileron, and
    (d) passage means in the aileron terminating at the trailing edge thereof and receptive of said air and passing the same outward of said trailing edge to create boundary layer suction across said wing,
    (e) said passage means comprising tapered passages in side-by-side relation extending transversely through the aileron.

2. In an aircraft having a wing extending from its fuselage and provided with an aileron having its trailing edge aligned with the trailing edge of the wing, boundary layer control means comprising:
    (a) air scoop means extending from the fuselage of the aircraft,
    (b) means to compress the air drawn into said scoop means during takeoff and landing flight of the aircraft,
    (c) means to conduct said compressed air to the aileron, and
    (d) passage means in the aileron terminating at the trailing edge thereof and receptive of said air and passing the same outward of said trailing edge to create boundary layer suction across said wing,
    (e) said passages tapering to smaller size at said trailing edge than at the end receiving the pressurized air.

3. In an aircraft according to claim 2, said passages having an oval cross-sectional form.

4. In an aircraft having a wing extending from its fuselage and provided with an aileron having its trailing edge aligned with the trailing edge of the wing, boundary layer control means comprising:
    (a) air scoop means extending from the fuselage of the aircraft,
    (b) means to compress the air drawn into said scoop means during takeoff and landing flight of the aircraft,
    (c) a hollow tube to which the aileron is connected and on the axis of which said aileron is moveable relative to the wing, said tube having a row of orifices,
    (d) passage means to conduct pressurized air from the air compressing means to the hollow tube, and
    (e) passage means in the aileron comprising tapered passages extending from said orifices in the tube to and terminating at the trailing edge of the aileron to conduct compressed air from said tube to said edge to create boundary layer suction across said wing.

5. In an aircraft according to claim 4, said first-mentioned passage means including a tank to store the pressurized air.

6. In an aircraft according to claim 4, said first-mentioned passage means including tank means comprising a storage tank housed in the fuselage, a tank housed in said wing, and a flow connection therebetween.

7. In an aircraft according to claim 6, the latter tank being provided with pressurized air outlets that extend into air-passing connection with the hollow tube adjacent the opposite ends thereof.

8. In an aircraft according to claim 6, the latter tank comprising:
    (a) a series of tank sections having valved connections one to the other,
    (b) the aileron being divided into sections corresponding to the number of tank sections, and
    (c) passages from each tank section to the passage means of a corresponding aileron section.

9. In combination in an aircraft:
(a) scoop means extending from the aircraft to draw air thereinto during takeoff and landing flight,
(b) a hollow tube extending along each wing of the aircraft and constituting a fulcrum for the aileron of each said wing, said tube having a plurality of orifices along the length thereof,
(c) means to compress the air drawn into the aircraft by the scoop means and conduct the same to said hollow tube, and
(d) tapered passages in the aileron in register with said orifices and terminating at the trailing edge aileron, said passages being receptive of said air and passing the same outward of said trailing edge to create boundary layer suction across said wing.

References Cited by the Examiner

UNITED STATES PATENTS 2,453,721  11/1948  Mercier _____ 244—75 X
2,568,812   9/1951  Lee _____ 244—52

FOREIGN PATENTS 1,149,478  12/1957  France.

MILTON BUCHLER, *Primary Examiner.*
ANDREW H. FARRELL, *Examiner.*